(12) United States Patent
Cabrini

(10) Patent No.: US 6,877,446 B2
(45) Date of Patent: Apr. 12, 2005

(54) TREATMENT PLANT FOR REFUSE DERIVED FUELS

(75) Inventor: Clementino Cabrini, Verona (IT)

(73) Assignee: RE.D.E. S.p.A., Verona (IT)

( * ) Notice: Subject to any disclaimer, the term of this patent is extended or adjusted under 35 U.S.C. 154(b) by 0 days.

(21) Appl. No.: 10/203,419

(22) PCT Filed: Feb. 15, 2001

(86) PCT No.: PCT/EP01/01716

§ 371 (c)(1),
(2), (4) Date: Nov. 29, 2002

(87) PCT Pub. No.: WO01/60947

PCT Pub. Date: Aug. 23, 2001

(65) Prior Publication Data

US 2003/0138748 A1 Jul. 24, 2003

(30) Foreign Application Priority Data

Feb. 18, 2000 (IT) ................... RE2000A0009

(51) Int. Cl.[7] .............. F23B 7/00; F23G 7/00; F23G 5/02
(52) U.S. Cl. ............ 110/342; 110/346; 110/230; 110/242; 110/219
(58) Field of Search .................. 110/230, 242, 110/342, 346, 229, 219, 224

(56) References Cited

U.S. PATENT DOCUMENTS

| 3,442,232 A | * | 5/1969 | White ..................... 110/18 |
| 4,280,417 A | * | 7/1981 | Alexandersson ........... 110/346 |
| 4,398,477 A | * | 8/1983 | Iwasaki .................... 110/346 |
| 4,732,091 A | * | 3/1988 | Gould ...................... 110/229 |
| 5,085,738 A | | 2/1992 | Harris et al. |
| 5,282,431 A | | 2/1994 | Kiss |
| 5,411,714 A | * | 5/1995 | Wu et al. ................. 422/232 |
| 5,541,386 A | * | 7/1996 | Alvi et al. ............. 219/121.38 |
| 6,048,374 A | * | 4/2000 | Green ........................ 48/209 |
| 6,105,275 A | * | 8/2000 | Aulbaugh et al. ............ 34/424 |
| 6,119,607 A | * | 9/2000 | Guy et al. ................. 110/346 |
| 6,189,462 B1 | * | 2/2001 | Ishida et al. ............... 110/346 |
| 6,213,030 B1 | * | 4/2001 | Robertson et al. ......... 110/246 |

FOREIGN PATENT DOCUMENTS

| EP | 0 672 743 | 3/1995 |
| FR | 2 288 139 | 3/1974 |

* cited by examiner

Primary Examiner—Kenneth Rinehart
(74) Attorney, Agent, or Firm—Browdy and Neimark, P.L.L.C.

(57) ABSTRACT

Process for incinerating refuse derived fuels to obtain fuel gas therefrom by thermal cracking, comprising the following steps: subjecting the material to deaeration; advancing a bed of material within a vacuum environment insulated from the outside (thermal cracking chamber) and in which a temperature of between 400 DEG C. and 600 DEG C. is maintained by the countercurrent flow of hot gases which lap the material; feeding the material which has passed through the thermal cracking chamber to a reactor in order to be subjected to a temperature of between 1200 DEG C. and 1800 DEG C.; in proximity ot the entry end of said thermal cracking chamber, drawing off the gases generated by the thermal cracking together with the gases which have lapped the bed of material, in order to maintain the thermal cracking chamber under vacuum; feeding the drawn-off gases to the discharge conduit for the gases generated in the reactor; purifying and filtering the gases obtained in this manner for their use as fuel gases.

13 Claims, 1 Drawing Sheet

TREATMENT PLANT FOR REFUSE DERIVED FUELS

TECHNICAL FIELD

Figure 1:
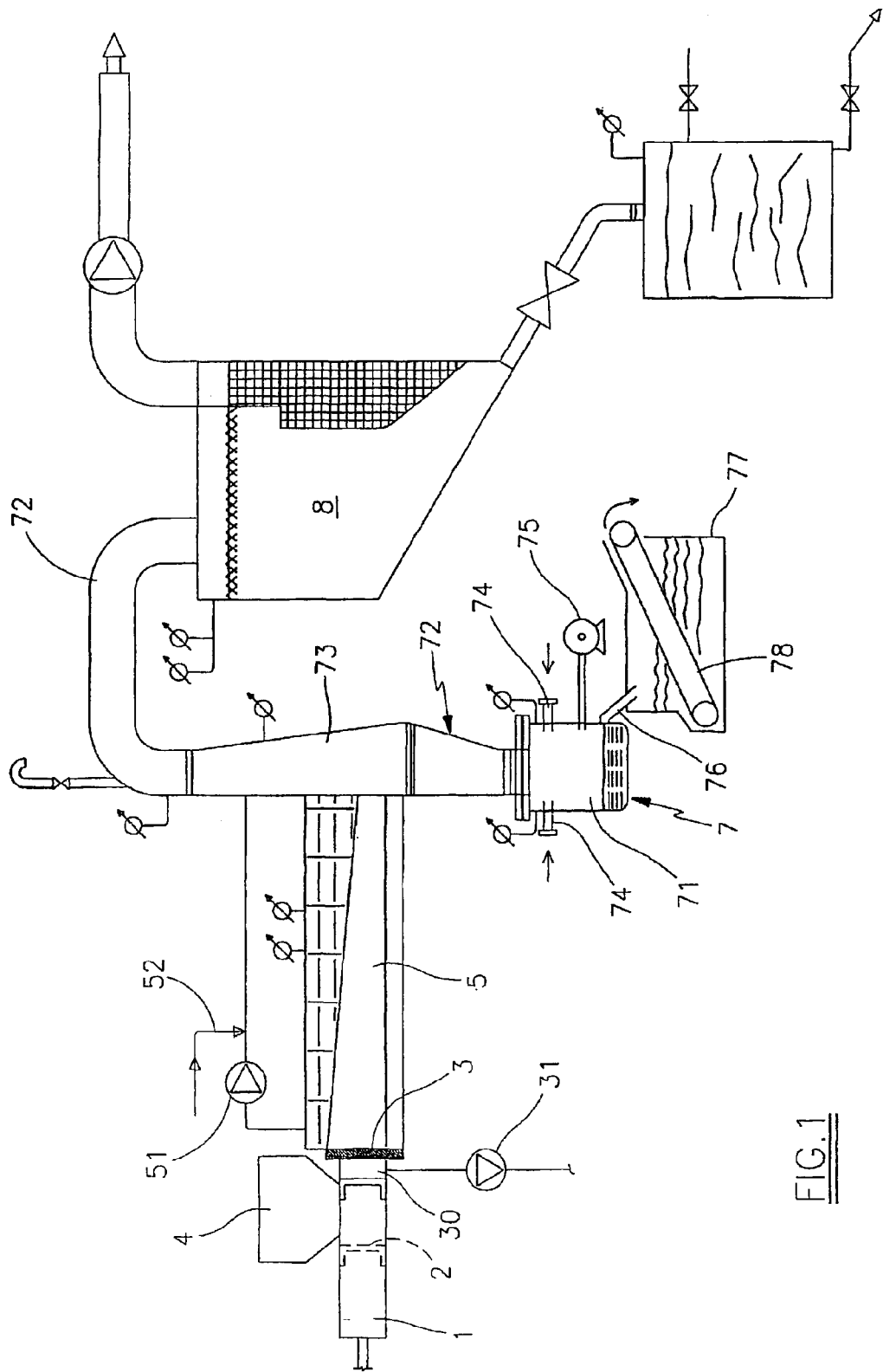

This patent concerns the refuse disposal sector in compliance with those regulations which protect the integrity of the environment.

BACKGROUND ART

The types of refuse which need disposal cover a very wide range, and require the use of very complex and different disposal techniques.

Within this range of refuse types, that commonly known as RDF, or refuse derived fuel, or alternative fuel is of particular importance.

RDF basically results from a sorting procedure by which all the incombustible components, such as iron, glass, aluminium, inert materials and anything else not contemplated by the rules governing RDF, including organic fractions generally consisting of food residues and other putrescible materials, are separated out.

The remainder is commonly known as refuse derived fuel, or RDF. RDF is currently treated in so-called incinerators, by which it is reduced into ash and gaseous combustion products.

Gaseous combustion products are highly polluting because they contain oxides of various types which are in themselves toxic.

The most common oxides are carbon monoxide, sulphur oxides and in particular nitrogen oxides.

At the exit of incinerators of known type, means for treating said oxides must be provided, resulting in increased plant costs and hence increased disposal costs.

The object of this patent is to provide an RDF treatment plant which has much lower operating costs than known plants, and generates combustion products which are non-polluting or of very low pollution, and can be partly reutilized in the form of fuel gas.

DISCLOSURE OF THE INVENTION

This object is attained basically by deaerating the material to be treated before subjecting it to high temperature, so drastically reducing oxide formation.

According to the invention, the material is subjected to high temperature under strong vacuum in order to facilitate thermal cracking in the presence of little oxygen, with the formation of gases rich in organic components not completely broken down.

This is obtained by feeding the material batchwise into a thermal cracking chamber in which a strong vacuum is created by a pump, this vacuum facilitating the countercurrent entry of hot gases originating from a reactor in communication with the exit section of the thermal cracking chamber.

In this reactor a fluid bed of ash is formed, above which oxygen or air is fed to achieve a further increase in temperature, to increase the gasification of the RDF.

Under normal working conditions the system is self-sustaining in the sense that the necessary temperature is automatically created within the reactor, whereas at the commencement of the cycle the process has to be triggered by an auxiliary burner positioned in the reactor chamber.

The gas drawn from the thermal cracking chamber to create the vacuum therein is enriched with oxygen to facilitate flameless oxidation of the volatile product, and conveyed to the reactor discharge stack to be fed to subsequent treatment before being reused as fuel gas.

In this respect, the gas leaving the reactor is rich in gaseous chlorine and dust composed both of the primary ash leaving the reactor, and powder deriving from unburnt material.

To eliminate said undesirable components it is fed into a scrubber provided with a filter, and to which calcium carbonate is also fed to neutralize the chlorine.

The scrubber filter then collects a pollutant product destined for a suitable dump, it being rich in chlorine.

At the scrubber exit the gas can thus be used as a fuel, if necessary after passage through one or more sleeve filters for final removal of residual dust.

The merits and characteristics of the invention will be apparent from the ensuing detailed description, illustrated by the FIGURE of the accompanying drawing and concerning a plant for implementing the process, given by way of non-limiting example.

FIG. 1 is a scheme of the plant according to the invention. The FIGURE shows a feed cylinder 1 in which a piston 2 is slidingly driven.

Said cylinder is closed at the opposite end to the piston by a valve 3, and is connected to an upper hopper 4 in which the RDF to be treated, reduced to a suitable size, is contained.

In the loading region 30, close to the closure valve 3, there are provided means for creating a slight vacuum, using a vacuum pump 31 which puts the material under slight vacuum at a pressure of between 450 and 550 mm Hg, so deaerating it.

Deaeration of the material is necessary to reduce the presence of nitrogen, and consequently of nitrogen oxides $NO_x$ in the thermal cracking fumes.

The cylinder communicates via the valve 3 with the thermal cracking chamber 5, which is generally of decreasing semicylindrical section in shape and opens into the expansion region 73 of the gas discharge conduit 72 of the actual reactor 7. This latter consists of a vessel 71 of suitable very high temperature-resistant material, from the top of which there branches the conduit 72, and into which two conduits 74 enter for feeding oxygen and air, plus an auxiliary burner 75.

The number of conduits 74 can also be other than two.

At a certain level, which defines the quantity of ash present in the reactor in fluid form, an overflow conduit extends from the reactor chamber to open into a water-filled tank 77, in which the ash is quenched, to be then withdrawn by a belt conveyor 78. At the entry to the thermal cracking chamber 5, a vacuum pump 31 countercurrently withdraws the gases which enter the chamber 5 from the region 73 of the conduit 72, to maintain the chamber 5 under vacuum.

The temperature of the gases flowing through the chamber 5 is between 500° C. and 700° C., and maintains the temperature at which thermal cracking of the material takes place at between 400° C. and 600° C.

The vacuum pump 51 feeds the withdrawn gases to the expansion region 73 of the conduit 72, these gases before reaching the conduit 72 being enriched with oxygen, at the point 52, to facilitate flameless oxidation of the volatile products.

After the expansion region 73 the conduit 72 leads into a scrubber 8, in which not only is the gas temperature reduced, with consequent reduction in gas volume, but in addition the ash entrained by the gases and the unburnt powder are removed. Calcium carbonate for treating the chlorine is also fed into the scrubber 8, resulting in the formation and deposition of calcium chloride CaCl.

The operation of the plant is as follows.

At the commencement of the cycle, already deaerated material to be treated is fed into the thermal cracking chamber, the reaction in the reactor being triggered by the auxiliary burner 75.

When the material gasification process within the reactor has progressed to an extent sufficient to be self-sustaining, aided by the temperature increase due to the feeding of oxygen, ozone or air through the conduits 74, the burner can be extinguished. The gases originating from the reactor pass from the expansion region of the reactor discharge conduit to lap the material lying in the thermal cracking chamber 5, by virtue of the vacuum created in this latter by the vacuum pump 51.

The material hence begins to gasify by virtue of the pyrolisis process under oxygen deficiency, the gas being pumped by the pump 51 into said discharge conduit 72 downstream of the thermal cracking chamber.

By way of example, it can be stated that the temperature in the thermal cracking chamber is about 500° C., and must preferably lie between 400 and 600° C.

The material originating from the thermal cracking chamber 5, thrust by the fresh material fed in at intervals by the piston 2, falls into the chamber of the reactor 7.

Inside the thermal cracking chamber 5 there forms a bed of ash which reduces the area of communication between this chamber and the gas discharge conduit 72, so that the action of the vacuum pump 51 gradually becomes more effective.

By way of example it can be stated that with a thermal cracking chamber of volume 8 m$^3$, an RDF quantity of the order of 1000 kg/hour can be treated, to obtain a fuel gas volume of about 3500 Nm$^3$ characterised by a calorific value of between 2000 and 3000 kCal/Nm$^3$, corresponding to an RDF calorific value of about 5000 kCal/kg.

What is claimed is:

1. A process for incinerating refuse derived fuels to obtain fuel gas therefrom by thermal cracking, comprising:
    subjecting the material to deaeration at a pressure of between 450 and 550 mm Hg;
    advancing a bed of material within a vacuum environment insulated from the outside (thermal cracking chamber) and in which a temperature of between 400° C. and 600° C. is maintained by the countercurrent flow of hot gases which lap the material;
    feeding the material which has passed through the thermal cracking chamber to a reactor in order to be subjected to a temperature of between 1200° C. and 1800° C.;
    in proximity to the entry end of said thermal cracking chamber, drawing off the gases generated by the thermal cracking together with the gases which have lapped the bed of material, in order to maintain the thermal cracking chamber under vacuum;
    feeding the drawn-off gases to the discharge conduit for the gases generated in the reactor;
    purifying and filtering the gases obtained in this manner for their use as fuel gases.

2. A process as claimed in claim 1, characterised in that the hot gases which pass through the thermal cracking chamber in countercurrent are derived from the stream of gases generated by the reactor.

3. A process as claimed in claim 1, characterised in that the hot gases which pass through the thermal cracking chamber in countercurrent have a temperature of between 500° C. and 700° C.

4. A process as claimed in claim 1, characterised in that the gases drawn from the thermal cracking chamber are enriched with oxygen for flameless oxidation of the volatile products.

5. A process as claimed in claim 1, characterised in that the material which falls into the reactor chamber is subjected to the action of a burner only at the initial triggering stage of the process.

6. A process as claimed in claim 5, characterised in that after the triggering, the material lying in the reactor chamber is subjected to an a feed of oxygen, with simultaneous increase in the temperature up to between 1200 and 1800° C.

7. A process as claimed in claim 1, in that the gases produced in the reactor chamber together with the gases withdrawn from the thermal cracking chamber are subjected to a scrubbing operation in water to remove the ash.

8. A process as claimed in claim 7, characterised in that simultaneously with the scrubbing, calcium carbonate is added to the material to reduce the chlorine.

9. A process as claimed in claim 7, in that the gas leaving the scrubber is further subjected to filtration.

10. An incineration plant for refuse derived fuel, comprising
    a thermal cracking chamber,
    means for feeding the material to said cracking chamber,
    means for creating vacuum in said cracking chamber,
    a reactor for receiving the material which has passed through the thermal cracking chamber,
    an expansion chamber located between the reactor discharge conduit and the thermal cracking chamber,
    means for bringing the material in the reactor to high temperature, and
    upstream of the thermal cracking chamber, a material deaeration chamber, which is separated from the thermal cracking chamber by a seal valve.

11. A plant as claimed in claim 10, in which the means for creating vacuum comprises a conduit connecting the region of the thermal cracking chamber close to the seal valve separating the cracking chamber from the deaeration chamber to the reactor discharge conduit downsream of the expansion chamber, and a pump which draws the gases from said region of the cracking chamber.

12. A plant as claimed in claim 10, in which a normal gas burner is provided in the lower part of said reactor.

13. A plant as claimed in claim 10, in which said reactor is connected to a source of oxygen.

* * * * *